Figure 3:
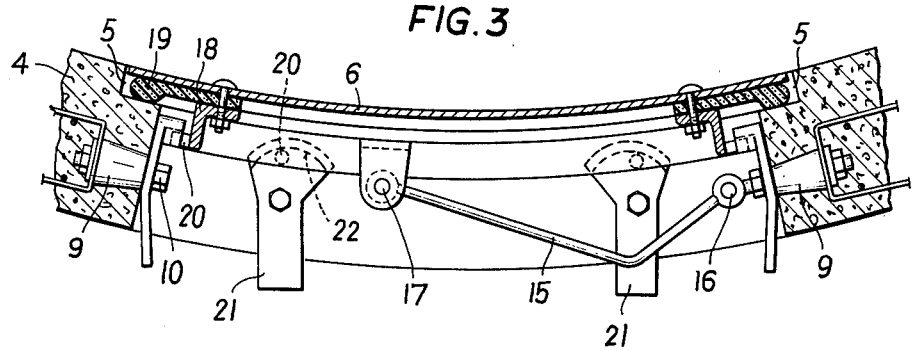

United States Patent [19]
Wolf

[11] 4,047,691
[45] Sept. 13, 1977

[54] FIXTURE FOR USE IN THE FORMATION OF A DISCHARGE OPENING OF A FODDER SILO

[75] Inventor: Johann Wolf, Scharnstein, Austria

[73] Assignee: Johann Wolf Gesellschaft m.b.H. KG., Scharnstein, Austria

[21] Appl. No.: 652,573

[22] Filed: Jan. 26, 1976

[30] Foreign Application Priority Data

Feb. 3, 1975 Austria .................................. 775/75

[51] Int. Cl.² .............................................. E06B 1/04
[52] U.S. Cl. ....................................... 249/97; 52/192; 52/204; 52/701; 249/39
[58] Field of Search ................... 49/246, 465, 504; 52/208, 192, 193, 701, 204, 213, 699; 249/39, 97

[56] References Cited

U.S. PATENT DOCUMENTS

| | | | |
|---|---|---|---|
| 806,832 | 12/1905 | Perrot | 52/699 |
| 1,044,533 | 11/1912 | Johnston | 52/213 |
| 1,130,307 | 3/1915 | MacCallum et al. | 52/192 X |
| 1,168,156 | 1/1916 | Brubaker | 52/196 |
| 1,341,533 | 5/1920 | Atkins | 52/196 X |
| 1,519,264 | 12/1924 | Reichert | 249/39 |
| 1,642,552 | 9/1927 | Millice | 52/216 |
| 1,882,942 | 10/1932 | Ross | 52/196 X |
| 2,466,549 | 4/1949 | Landine | 52/208 |
| 2,557,631 | 6/1951 | Callan | 249/39 X |
| 3,048,946 | 8/1962 | Hawk et al. | 52/196 |

FOREIGN PATENT DOCUMENTS

| | | | |
|---|---|---|---|
| 1,070,705 | 2/1954 | France | 52/208 |
| 589,463 | 12/1933 | Germany | 52/196 |
| 1,115,210 | 10/1961 | Germany | 49/246 |
| 686,195 | 1/1953 | United Kingdom | 49/465 |
| 110,587 | 10/1917 | United Kingdom | 52/213 |

Primary Examiner—Alfred C. Perham
Attorney, Agent, or Firm—Young & Thompson

[57] ABSTRACT

The fixture is used in the formation of a discharge opening of a fodder silo of reinforced concrete during the placing of said concrete. The fixture comprises a form frame which consists of a plurality of parts which are adapted to be taken apart. The form frame is adapted to define said discharge opening during the placing of said concrete. Anchors are detachably connected to said form frame and adapted to carry reinforcements for reinforcing said concrete. Said form frame is adapted to be disconnected from said anchors when said concrete has been placed. When said concrete has been placed and said form frame has been disconnected from said anchors, the latter are adapted to carry mounting means for mounting a door for closing said discharge opening.

2 Claims, 6 Drawing Figures

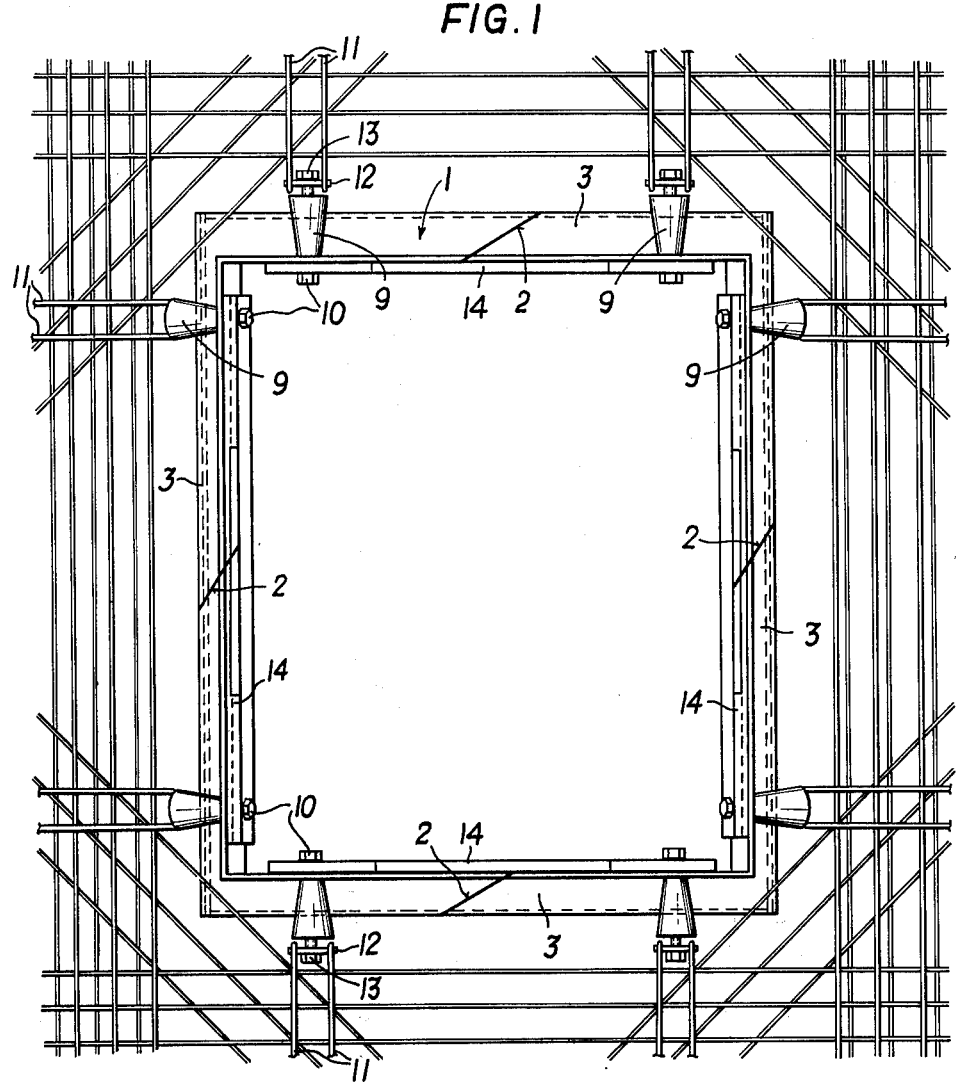
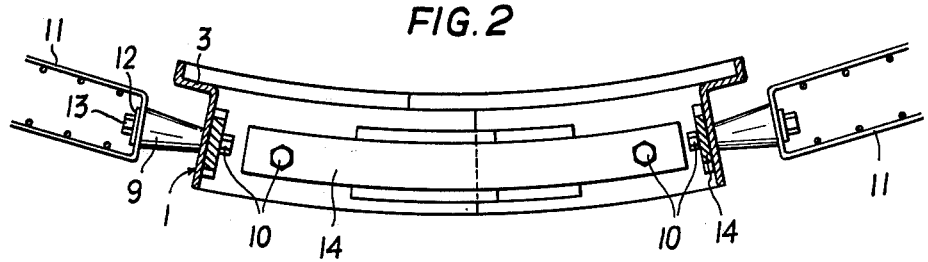

FIXTURE FOR USE IN THE FORMATION OF A DISCHARGE OPENING OF A FODDER SILO

This invention relates to a fixture for use in the formation of discharge openings in forage silos and for mounting doors for closing the discharge opening.

Fodder silos are provided with discharge openings, which are vertically spaced in a row and through which the ensilaged fodder can be discharged. Before the silos are filled, the discharge openings must be closed as gastightly as possible by means of removable doors. The ensilage is discharged first from the top until the first door is accessible. This first door is then opened and the ensilage is subsequently discharged through that discharge opening. During the discharge, one door after the other is opened so that the ensilage can be discharged through one opening after the other.

The ensilage is discharged by hand with the aid of hand implements or by mechanical discharge means, such as an ensilage unloader.

Good ensilage cannot be obtained unless the discharge openings are gastightly closed before the silo is filled. This requirement is applicable also to the edges of the discharge openings, where cracks often form; these cracks originate particularly at the corners. During the erection of silos made from concrete, form frames are inserted so that the discharge openings are held open. In that practice, the reinforcement in the area held open is often displaced during the placing of the concrete and particularly during the subsequent vibrating operation, which is essential for compacting the concrete. The abovementioned cracks may then form during the setting of the concrete.

Another disadvantage of presently known embodiments resides in that a separate frame for sealing the door must be embedded in the concrete or gastightly connected to the concrete by screws. The corrosive acids produced in the fermentation process result in a rapid corrosion so that these frames must be renewed from time to time.

To avoid a formation of cracks at the edges of the discharge openings, reinforcements of concrete-reinforcing steel must be provided along the four sides and possibly also diagonally at the corners. It is difficult to ensure that the reinforcement is immovably arranged adjacent to the discharge openings, which is held open by the form frame when the concrete is cast. The reinforcement is often shifted during the placing and subsequent vibrating of the concrete.

To ensure a formation of uniform discharge openings when the silos are being cast, identical form frames are used, which can be knocked down and have the shape desired for the discharge openings. This is also required to ensure that the doors will be interchangeable and can be manufactured in quantity.

It is an object of the invention to provide a fixture which ensures the formation of uniform discharge openings, which are well reinforced on all sides, and also ensures that the discharge openings can be gastightly closed in a simple manner with easily interchangeable doors.

This object is accomplished in accordance with the invention in that anchors are detachably secured to a composite form frame which is adapted to be taken apart, and these anchors are adapted to carry reinforcements of the fodder silo and, when the form frame has been removed, are adapted to carry means for fixing the door.

In a preferred embodiment of the invention, the anchors consist of tapped bushings, which are provided with tapped bores extending from the end faces, or with a tapped through bore, and one end face of each anchor is engageable with the form frame and the other serves to hold the reinforcement in position.

In another embodiment of the invention the anchors consist of multi-flanged metal strips or of flat bars or of sectional steel and are provided at one end with a surface for engaging the form frame and with a tapped bore whereas the other end is provided with clamp or screw means for connection to the reinforcement.

Within the scope of the invention, the form frame is divided along a plurality of oblique plane interfaces, which are bridged by plates that are connected to the anchors. The form frame may be provided on its inside with a laterally protruding, peripherally continuous flange, which defines a recess that extends around the discharge opening on the inside surface of the silo and is adapted to receive a door.

The anchors provided and designed in accordance with the invention may be used to connect a form frame in the designed position to a reinforcement in such a manner that there is no risk of a relative displacement during the placing and particularly the vibrating of the concrete. For this reason, discharge openings may be formed in fodder silos without a risk of a formation of cracks. Even before the concrete has set, the form frame can be removed from the anchors in a simple manner and the same may now be used to carry means for mounting doors. The mounting and the removal of the form frame and the mounting of means for mounting doors will be particularly facilitated if the anchors consist of tapped bushings or of multi-flanged metal strips or sectional steel.

To enable the mounting of a door which can be swung open into the interior of the silo, a preferred feature of the invention resides in that at least two angled links are hinged, to the door and to vertically aligned anchors, and clamping members secured to the anchors are mounted on all four sides of the discharge opening and engage the door. In accordance with a preferred feature of the invention, the clamping members are hinged to the anchors and provided with clamping faces which are eccentric with respect to their pivotal axis and associated with pins secured to the door.

In accordance with a preferred feature of the invention, the door is connected on its outside to a stiffening frame, a gasket is replaceably held between the door and the stiffening frame, and the pins are secured to the stiffening frame.

In a further embodiment of the invention, a frame is secured to the anchors by means of lugs or the like mounted on the frame, said frame is sealed against the recess that surrounds the discharge opening on the inside surface of the silo, and said frame is provided with abutment surfaces for inwardly or outwardly opening doors. According to a preferred feature of the invention, the lugs or the like carry abutments for clamping levers, which bear on abutments provided on the outside of an outwardly opening door and are preferable by means of turnbuckles. In accordance with the invention, the abutments on the door may consist of a stiffening rib, which is connected to the outside of the door.

Instead of lugs, the means used to secure the frame may consist, in accordance with a preferred feature of the invention, of a web which is secured to the frame and engages the reveal of the discharge opening, and the arrangement may be such that the frame is substantially Z-shaped in cross-section, the web engages that surface of the recess which extends in the peripheral direction, and an elastic seal or a plastic sealing compound is disposed between the radially inwardly extending flange and that surface of the recess which is parallel to said flange.

To provide an abutment surface for an outwardly opening door, a preferred feature of the invention resides in the the web of the frame has an extension which protrudes into the discharge opening.

Figure 4:
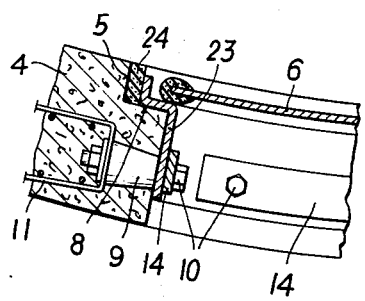
Figure 5:
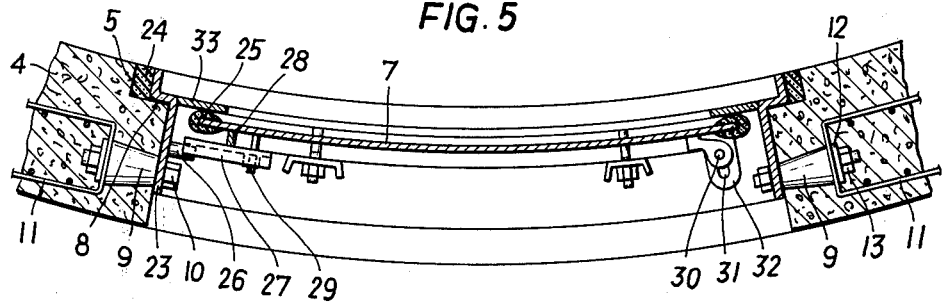
Figure 6:
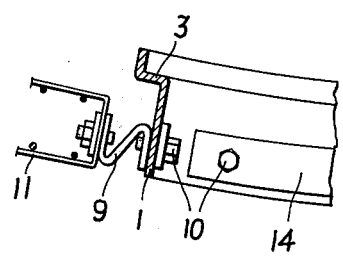

Details of the fixture provided in accordance with the invention for use in the formation of discharge openings in fodder silos and for the mounting of doors for the discharge openings will be explained with reference to the accompanying, in which FIG. 1 is an outside elevation showing a form frame with reinforcement for forming a discharge opening in a fodder silo, FIG. 2 is a horizontal sectional view showing the form frame and reinforcement, FIG. 3 is a horizontal sectional view showing an inwardly opening door, FIG. 4 is a horizontal sectional view showing another embodiment of an inwardly opening door, FIG. 5 is a similar view showing the fixture for a door which can be lifted off outwardly, and FIG. 6 shows a detail of a modified embodiment.

In accordance with FIGS. 1 and 2, a form frame 1 is provided for use in the formation of a discharge opening in fodder silos during the concreting operation. The form frame is composite and has oblique flat interfaces 2. On its inside, the form frame 1 has a peripherally continuous, laterally protruding flange 3, which defines on the inside surface of the silo wall 4 a recess 5 around the discharge opening. This recess may serve to receive an inwardly opening door 6, as is shown in FIG. 3, or a frame 8 for an inwardly opening door, as shown in FIG. 4, or a frame 8 for an outwardly door 7, as shown in FIG. 5. Anchors 9 are detachably connected to the form frame 1 and in accordance with FIGS. 1 to 5 consist of tapped bushings, which are secured by screws 10 to the frame 1. One end of the anchors 9 constitutes a flat abutment surface. The other end of these anchors 9 serves to secure reinforcements 11, which consist of reinforcing bars bent in U-shape and to which the remaining reinforcements may be connected. These U-shaped reinforcements 11 may be received in grooves of the anchors 9 or may be connected to the anchors 9 by clamping plates 12 and screws 13.

As is apparent from FIG. 6, the anchors 9' may alternatively consist of multi-flanged metal strips or of flat bars or sectional steel. These anchors are also formed at one end with an abutment face and a tapped bore for the fixation of the form frame 1 and at their other end with clamp or screw means for connection to the reinforcement 11.

The anchors 9 serve also to secure plates 14, which bridge the oblique plane interfaces of the form frame 1 and connect the parts thereof in a unit. The manner in which the form frame 1 is secured to the reinforcement 11 ensures that during the concreting operation the reinforcement, inclusive of oblique reinforcing rods disposed in the corners, cannot shift relative to the discharge opening to be formed, and that the form frame 1 is held in the correct orientation at the desired location. As a result, when the concreting operation has been completed, the screws 10 may be disconnected from the anchors 9 and the form frame may be removed whereas the anchors 9 are immovably held in the concrete even though the same may not yet have set. To improve the connection to the concrete, the anchors 9 consisting of tapped bushings may have a roughened or serrated or similarly shaped outside surface. To improve their fit, the tapped bushings may either have tapped bores extending from both ends or a single tapped through bore.

When the form frame 1 has been removed - this is facilitated by the oblique planes of division 2- doors 6 or 7 may be inserted. FIG. 3 shows an inwardly opening door 6, which is hinged by at least two cranked links 15 and hinges 16 to vertically aligned anchors 9. The links 15 are secured to the door 6 by hinges 17. The door 6 has no frame and on its outside surface carries a stiffening frame 18, which holds a replaceable gasket 19 in position. The door engages the silo wall 4 in the recess 5 with this gasket 19 and is held flush with the inside surface of the silo by pins 20, which are suitably mounted on the stiffening frame 21 and cooperate with clamping members 21, which are pivoted to anchors 9. The clamping members 21 have clamping surfaces 22, which are eccentric with respect to the pivotal axis of the clamping member, so that the door 6 can be pulled into the recess 5 by a pivotal movement of the clamping members 21. The clamping members 21 may be pivoted to the anchors 9 with the screws 10 which were previously used to fix the form frame 1. When the clamping members 21 have been released, the door 6 can be swung inwardly and to a position beside the discharge opening by means of the links 15. An inwardly opening door has the additional advantage that the contents of a filled silo also urge the door against its abutment.

The embodiment of the invention shown in FIG. 4 comprises a frame 8 which serves to mount an inwardly opening door 6 and which is secured to the anchors 9 by means of lugs or a peripherally continuous web 23 or the like means which engage the reveral of the discharge opening and by bores, which serve to receive the screws 10 used also to secure the form frame 1. Where a web is used, the frame 8 is Z-shaped in cross-section. To seal the frame 8 against the silo wall 4, an elastic gasket 24 is inserted or a plastic sealing compound is introduced into a space defined by a radially extending flange and that surface of the recess 5 which is parallel to said flange. The peripherally extending web of the frame 8 constitutes an abutment surface for the inwardly opening door 6, which can be forced against said abutment surface by means which are identical or similar to those shown in FIG. 3.

The door 7 shown in FIG. 5 can be lifted outwardly and is also held in the discharge opening by the anchors 9. For this purpose, the frame 8 is provided, which has lugs or the like means, e.g., a peripherally continuous web 23, and for this reason is Z-shaped in cross-section. The lugs or the web 23 engage the reveal of the discharge opening and have bores which are adapted to receive the screws 10 previously used to secure the form frame. The radial flange of the frame 8 and that surface of the recess 5 which is parallel to said radial flange define a space into which an elastic gasket 24 can be inserted or a plastic sealing compound can be introduced, as shown in FIG. 4. The web of the frame 8 has an extension 33, which extends into the discharge opening and/is engaged by the door 7 with a gasket 25. The lugs or the web 23 carry abutments 26, e.g., pins, for engagement by clamping levers 27, which bear on abutments 28 carried by the door on the outside thereof. Turnbuckles 29 are operable to impart a pivotal movement to the clamping levers so that the door 7 is forced against the extension 33 of the frame 8. The abutments 28 may consist of a stiffening rib disposed on the outside of the door. Alternatively, the door 7 may be adapted to be swung open outwardly. In this case, hinge pins 30 are mounted in brackets 32, which are connected to the frame 8 and provided with slots 31. This mounting ensures that the door 7 can be forced into a uniform engagement with the frame 8 by a plurality of clamping levers 27.

The mountings of both doors 6 and 7 afford the advantage that fixing means which are susceptible to destruction by corrosive acids are not provided on the inside of the fodder silo. Any damaged door and the frame 8 provided in accordance with FIGS. 4 and 5 can easily be replaced.

The fixture according to the invention has been described and shown in an embodiment which serves only for an explanation of the nature of the invention but the latter is not restricted to details.

What is claimed is:

1. A fixture for use in the formation of a discharge opening of a fodder silo of reinforced concrete during the placing of said concrete, which comprises a form frame which consists of a plurlity of parts which are adapted to be taken apart, said form frame being adapted to define said discharge opening during the placing of said concrete, anchors detachably connected to said form frame and adapted to carry reinforcements for reinforcing said concrete, said form frame being adapted to be disconnected from said anchors when said concrete has been placed, said anchors being adapted, when said concrete has been placed and said frame has been disconnected from said anchors, to carry mounting means for mounting a door for closing said discharge opening, each of said anchors comprising a tapped bushing having first and second ends and tapped bore portions extending from said ends, said first end engaging said form frame and said second end being connected to said reinforcement, said form frame being divided along a plurality of oblique planar interfaces, plates which bridge said interfaces, and screws that pass through said plates and form frame and detachably screw-threadedly engage in said first ends of said anchors.

2. A fixture as claimed in claim 1, in which; said tapped bore portions are portions of a continuous bore through each of said anchors.

* * * * *